United States Patent
Thompson

(10) Patent No.: US 7,625,249 B2
(45) Date of Patent: *Dec. 1, 2009

(54) QUAD FIELD DATA DISTRIBUTION SYSTEM WITH FIBER OPTIC CONVERTER

(75) Inventor: Alvin Dean Thompson, St. Joseph, MO (US)

(73) Assignee: DT Search & Designs LLC, St. Joseph, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/173,432

(22) Filed: Jul. 15, 2008

(65) Prior Publication Data

US 2009/0003792 A1   Jan. 1, 2009

Related U.S. Application Data

(63) Continuation-in-part of application No. 12/033,296, filed on Feb. 19, 2008, which is a continuation-in-part of application No. 11/803,888, filed on May 16, 2007, now Pat. No. 7,445,520, which is a continuation of application No. 11/168,580, filed on Jun. 28, 2005, now Pat. No. 7,238,063.

(60) Provisional application No. 60/583,505, filed on Jun. 28, 2004.

(51) Int. Cl.
*H01R 9/22* (2006.01)

(52) U.S. Cl. .................. 439/709; 439/535
(58) Field of Classification Search ............. 439/149, 439/404, 409, 535, 709; 174/59
See application file for complete search history.

(56) References Cited

U.S. PATENT DOCUMENTS

| | | | | |
|---|---|---|---|---|
| 7,238,063 B2* | 7/2007 | Thompson | ............. | 439/709 |
| 7,445,520 B2* | 11/2008 | Thompson | ............. | 439/709 |

* cited by examiner

*Primary Examiner*—Thanh-Tam T Le
(74) *Attorney, Agent, or Firm*—Polsinelli Shughart PC; Dennis A. Crawford

(57) ABSTRACT

A quad field data distribution system with a fiber optic converter includes a weatherproof housing with a hinged lid and a panel positioned in the housing and having a plurality of interconnection groups of connector elements mounted on the panel. Each interconnection group includes a multiple contact box connector, sets of insulation displacement connectors connected to respective sets of the contacts of the box connector, and a plurality of auxiliary connectors having the contacts of pairs of the insulation displacement connectors connected thereto. Each group additionally includes a bidirectional optical to electrical media converter circuit including a standardized optical data connector and a standardized electrical data connector interfaced thereto. Operating power is provided to the media converter circuit by an external DC power supply through a panel mounted power jack.

16 Claims, 8 Drawing Sheets

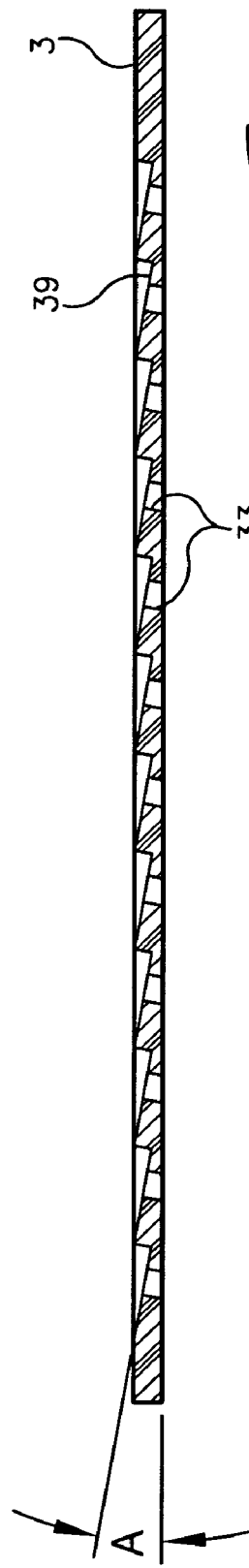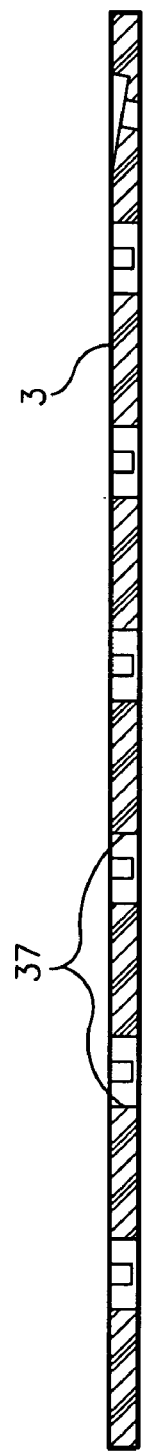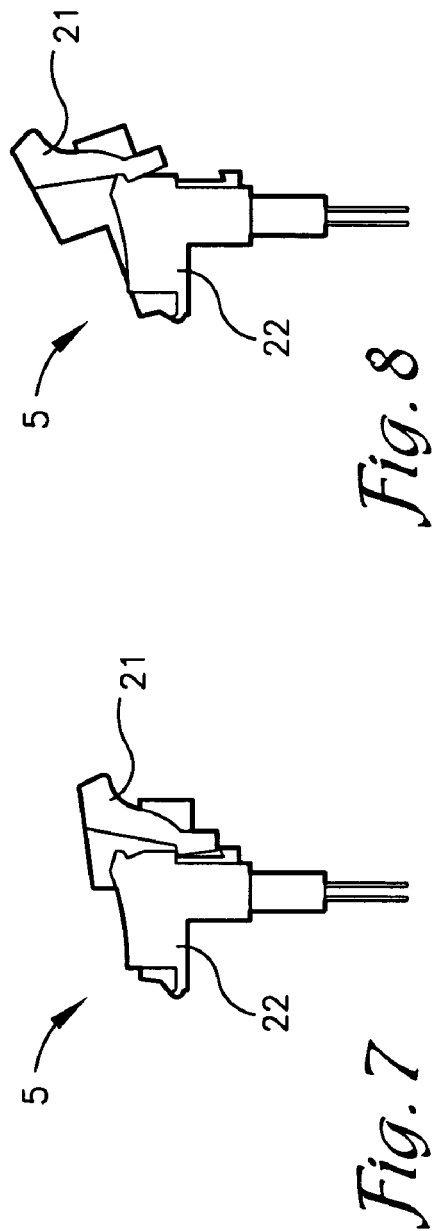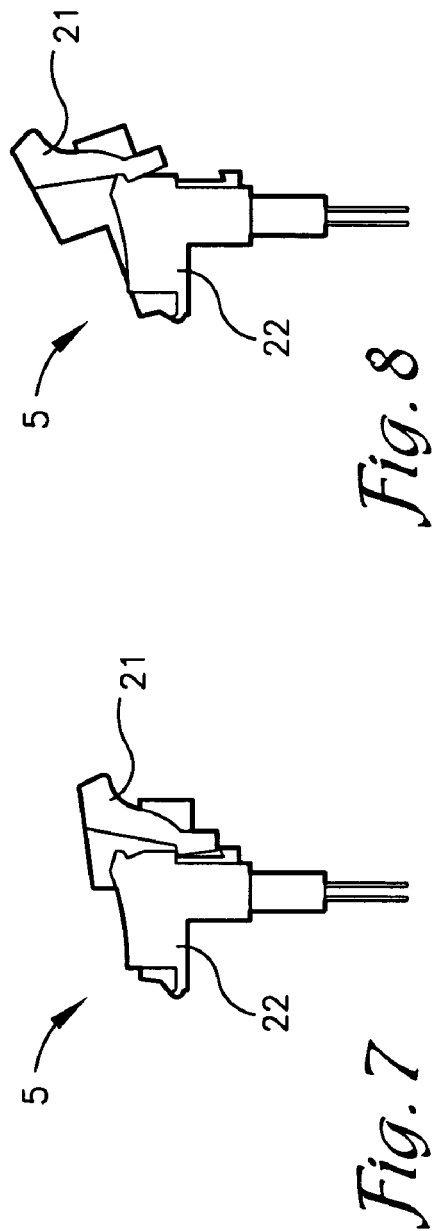

QUAD FIELD DATA DISTRIBUTION SYSTEM WITH FIBER OPTIC CONVERTER

CROSS-REFERENCE TO RELATED APPLICATION

This is a continuation-in-part of U.S. patent application, Ser. No. 12/033,296, filed Feb. 19, 2008 for FIELD DATA DISTRIBUTION SYSTEM WITH FIBER OPTIC CONVERTER, which is a continuation-in-part of U.S. patent application, Ser. No. 11/803,888, filed May 16, 2007, which issued as U.S. Pat. No. 7,445,520 and which is a continuation of U.S. patent application, Ser. No. 11/168,580 filed Jun. 28, 2005 for FIELD COMMUNICATION AND COMPUTER DATA DISTRIBUTION SYSTEM, which issued as U.S. Pat. No. 7,238,063 and which claims priority under 35 U.S.C. 119(e) and 37 C.F.R. 1.78(a)(4) based upon copending U.S. Provisional Application, Ser. No. 60/583,505 for FIELD COMMUNICATION AND COMPUTER DATA DISTRIBUTION SYSTEM, filed Jun. 28, 2004. The disclosures of Ser. Nos. 12/033,296, 11/803,888, and 60/583,505 and U.S. Pat. No. 7,238,063 are incorporated herein by reference.

BACKGROUND OF THE INVENTION

The present invention relates to field communication distribution equipment and, more particularly, to improvements in individual and grouped connectors for such equipment and for testing the integrity of circuits employing such connectors.

The J-1077 A/U distribution box or signal distribution panel (hereinafter referred to simply as the "J-1077") is used to interconnect military field telephones and other communication devices in mobile, transportable, and semi-permanent installations. The J-1077 has provisions for connection of one or two 26 conductor-pair cables to a set of 26 pairs of spring post connectors mounted on a panel within the box. As such, the J-1077 can interconnect two 26-pair cables or can terminate a single 26-pair cable and provide connections to the conductors within the cable, such as for telephone sets or test equipment. The J-1077 has been in use for several decades and has proved to be generally rugged and reliable in varied field conditions. Additional information about the J-1077 distribution box can be obtained from Associated Industries of North Hollywood, Calif. (www.associated-ind.com) and from other sources.

Although generally successful, the J-1077 has some shortcomings. The configuration of the spring post connectors requires that wires be stripped before insertion into the posts. Stripping sometimes damages some of the strands of a conductor, causing them to break off, thereby reducing the signal carrying capability of the conductor. Stripping is also time-consuming if a large number of connections need to be made at one time.

Another problem with the J-1077 is that if a communication malfunction occurs in a system using J-1077 distribution boxes and cables, it is often difficult and time-consuming to isolate the problem among the possible 26 circuits which may be in use. At present, the usual procedure is to disconnect and reconnect each wire until the problem is isolated. A related problem is detecting the location of a break or cut in the cable or unauthorized connections to the network, such as by an enemy. Finally, there are no provisions on a standard J-1077 box for connection of computers thereto to enable field networking of computers or data communication between computerized devices using the J-1077 system.

Some types of military communication equipment have optical data signal interfaces which utilize optical fiber communication media. Optical data signals have a number of advantages in military applications, including high efficiency over long distances, high data rates, difficulty of tapping by an enemy, and the like. There is also a need for converting signals carried by optical fiber media to electrical data signals for carriage by conventional copper based cables.

United States military services also make use of an expanded field distribution box or signal distribution panel designated as the J-2317 A/U box (referred to hereinafter simply as the J-2317 box) which has the interconnection capabilities of four J-1077 boxes. The conventional J-2317 box includes four 26-pair cable connectors, designated as connectors A, B, C, and D. Each cable connector terminates at a respective set of binding posts to enable patching of communication devices to 26-pair cables connected to the cable connectors.

SUMMARY OF THE INVENTION

The present invention provides a number of improvements in J-1077 type distribution boxes. In the present invention, the spring post connectors are replaced by sets of insulation displacement connectors (IDC) mounted on a connector panel. Each insulation displacement connector generally has a movable top section which comprises two wire insertion holes and a lower fixed section which houses a pair of terminal strips. The terminal strips have a wire engaging portion at one end for engaging and making electrical contact with a wire. The terminal strips are generally parallel to one another but offset to provide a sufficient dielectric strength between them. In order to establish an electrical connection between the wires and the terminal strips a user first opens the top section, i.e., pivots the top section to its open position, inserts the pair of wires, and then closes the top section. Upon closing the top section of the connector, the wires are forced through the terminal strip engaging portion to make electrical and mechanical contact with the terminal strips. To remove the wires and/or break the electrical connection, the process is reversed. Each spring binding post on the connector panel of the J-1077 distribution box is replaced by an insulation displacement connector unit. The connectors of the present invention are mounted on the J-1077 panel in pairs in the same manner as the spring binding posts they replace.

The connectors typically carry audio frequency communication signals. In order to facilitate troubleshooting to find which circuit may have a problem, it is a common practice to remove a conductor from a binding post, one at a time, until the problem circuit is identified. Such disconnecting and reconnecting is laborious and can damage the stripped wire ends, requiring that the wire end be stripped before reconnecting. The present invention overcomes this problem by providing a test switch in at least one conductor of each pair. By this means, the test switch can be opened to disconnect the circuit instead of physically removing the conductor from the connector. Preferably, a double pole, single throw switch is connected between the pairs of terminals of the pair of connector devices.

An embodiment of the present invention provides a means for detecting the approximate location of a cut or break in one of a series of interconnected cables of the type that are used with the J-1077 distribution box. Typically, the cables are formed by 26 numbered pairs of conductors. Normally, only 25 pairs carry communication signals, while the No. 26 pair is used for testing and troubleshooting purposes. The present invention provides at least one resistor per cable, connected across the No. 26 conductor pair. When a plurality of cables are interconnected end to end by J-1077 boxes, the resistors of the cables are connected in parallel. If the resistance of the parallel combination is measured, the number of unbroken cable sections can be determined from the composite resistance and compared with the composite resistance expected from the number of cables present.

A standard resistor may also be connected across each end of the No. 26 pair of each cable section. By this means, the integrity of a single cable section can be determined by measuring the resistance across the No. 26 conductor pair.

In order to provide for digital communications between computers and computerized equipment, the improved J-1077 type distribution box of the present invention may have some of the insulation displacement connectors interconnected to connectors more appropriate for computer networks or for interconnections between modems. Such connectors can include, but are not limited to, RJ-45, RJ-11, and RJ-12 modular type connectors; BNC type connectors; and other connectors commonly employed for interconnections between computers. Conductors of the cables interconnecting the improved J-1077 boxes and carrying data between computers may be shielded separately from the other conductor pairs to minimize possible interference to and from other signals on other conductor pairs. Data connectors and associated cable conductors would provide some limited computer networking capabilities in addition to more conventional analog voice communications in systems employing J-1077 type distribution boxes. Alternatively, other types of connectors can be connected to selected insulation displacement connectors, such as standard phone connectors, F-type connectors, fiber optic adapters, and other standard types of network, telephone, audio, video, and signal connectors.

An embodiment of the distribution box of present invention is provided with a media converter for converting between optical data signals and electrical data signals. A standard type of fiber optic connector is provided on the connector along with a standard type of electrical data connector. The fiber optic connector may, for example, be an ST type of optical connector while the electrical connector is an RJ-45 connector. Media converter circuitry is interfaced to the optical and electrical data connectors and bilaterally converts between a standard optical data format and a standard electrical data format. The formats may, for example be 1000Base-SX for the optical data format and 1000Base-T for the electrical data format. Electrical power for operation of the media converter circuitry may be provided by a transformer and rectifier unit connected to a power strip or generator, a battery of an appropriate size, or the like.

The present invention provides an embodiment which combines the optical data conversion capabilities of the previously described embodiment to the expanded interconnection capabilities of a field distribution panel or box similar to in many respects to the J-2317 field distribution box. The distribution box includes a plurality of interconnection groups, such as four interconnection groups. Each interconnection group includes a multiple terminal box connector, such as a standard connector having 26 pairs of conductors/terminals. The pairs of terminals of the box connector are connected to corresponding pairs of terminals of insulation displacement connectors mounted in sets on a panel of the box. The terminals of the most of the insulation displacement connectors are connected to terminals of standardized auxiliary connectors mounted in sets on the panel of the box. The auxiliary connectors may be any of a number of types of standardized connectors to facilitate the connection of standard types of communication devices to the distribution box.

In an embodiment of the present invention, the terminal pairs of 24 of the insulation displacement connectors are connected in pairs (four conductors) to a set of twelve standard RJ-45 connectors.

Each interconnection group includes media converter circuit or circuitry for converting between optical data signals and electrical data signals. A separate converter RJ-45 connector is provided for the electrical data signal and connects to an electrical port of the media converter circuit. A standard type of optical connector, such as an ST type of optical connector, is interfaced to an optical port of the media converter circuit. A power jack is connected to a power input of the media converter circuit to provide DC operating power therefor. The DC power may also be made available to a conductor pair of the cable, such as through the $25^{th}$ conductor pair of the cable and box connector. The DC power may be provided by a transformer/rectifier unit connected to an AC line of a power strip or generator, a battery of an appropriate voltage and ampere-hour capacity, or the like. The converter RJ-45 connector is not connected directly to conductors of the box connector. However, a patch cord can be used to connect the converter RJ-45 connector to one of the RJ-45 connectors to provide electrical signal communication remote from the distribution box. As described above, the media converter circuit may provide a data conversion between a 1000Base-SX optical data signal format and a 1000Base-T electrical data signal format.

Various objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 5 is a longitudinal sectional view of the modified connector panel taken on line 5-5 of FIG. 4.

FIG. 6 is a longitudinal sectional view of the modified connector panel taken on line 6-6 of FIG. 4.

FIG. 7 is a greatly enlarged side elevational view of an insulation displacement connector used in the modified J-1077 distribution box of the present invention, with a top section shown in a closed position.

FIG. 8 is a view similar to FIG. 7 and illustrates the insulation displacement connector with the top section shown in an opened position.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
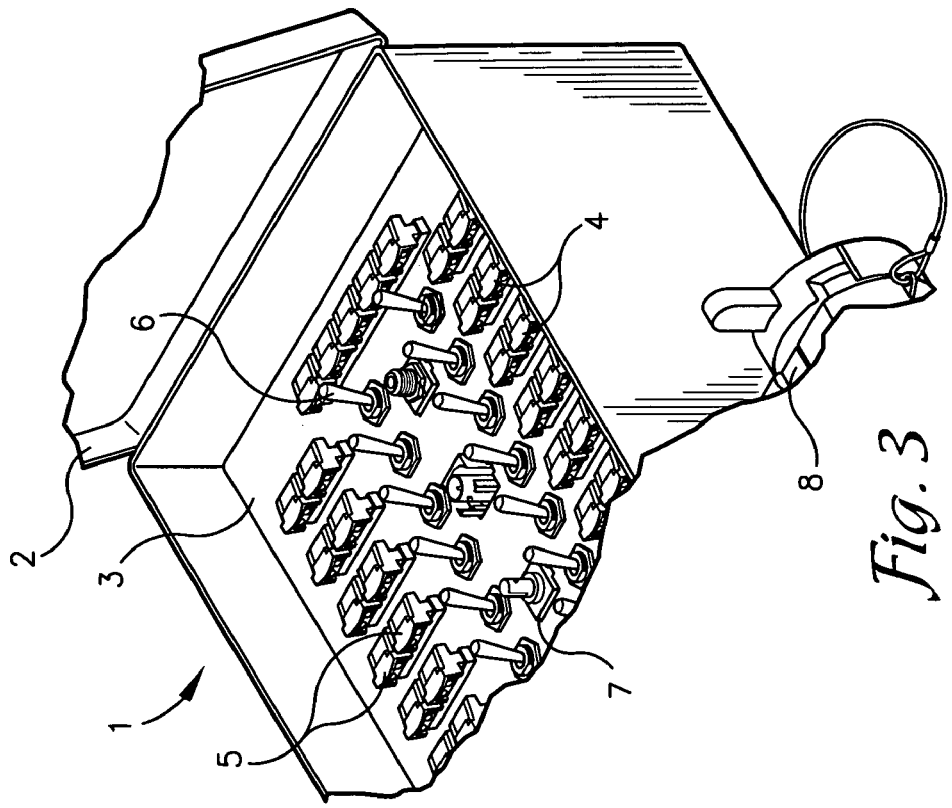
FIG. 2 is a perspective view of a J-1077 box with insulation displacement connector sets and test switches which embodies the present invention.
Figure 3:
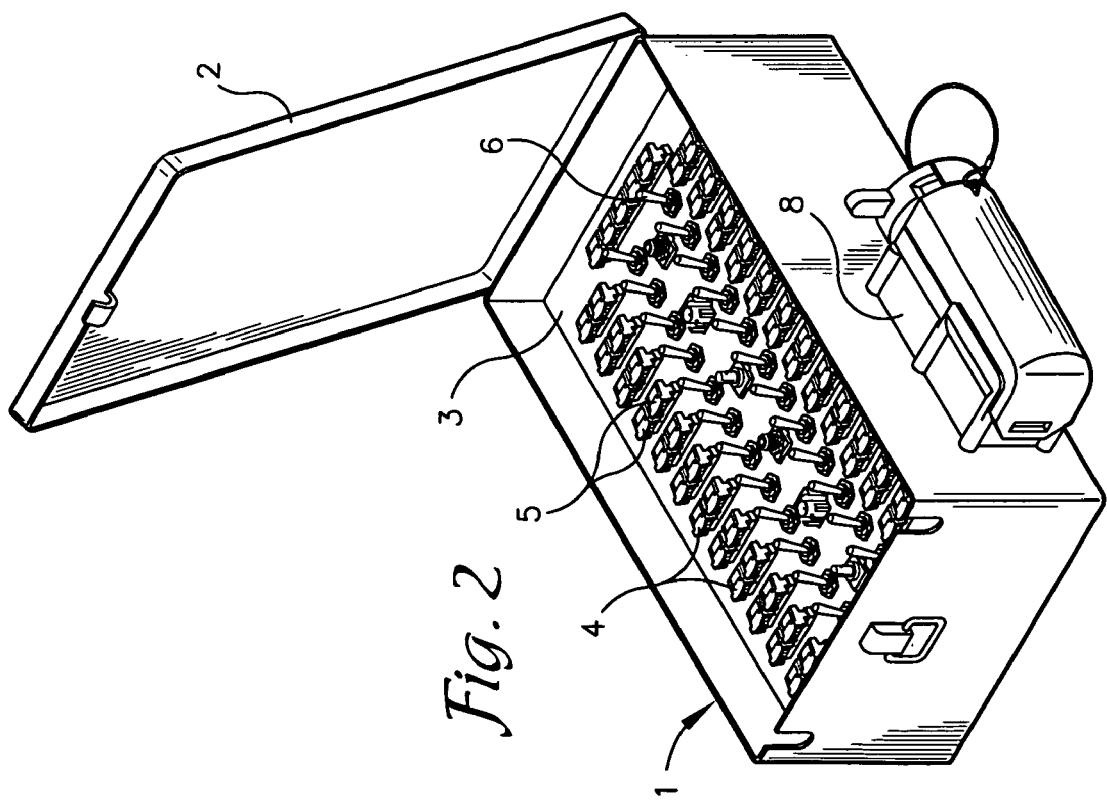
FIG. 3 is an enlarged fragmentary perspective view similar to FIG. 2 and illustrates elements the modified J-1077 box in more detail.

Referring to the drawing in more detail, the reference numeral 1 (FIGS. 2 and 3) generally designates an improved field communication distribution box which embodies the present invention. The box 1 generally includes an access door or lid 2 hingedly connected thereto and a connector panel 3 positioned in the box 1 and having pairs 4 of insulation displacement connectors 5, test switches 6, and auxiliary connectors 7 mounted thereon. The box 1 has box connectors 8 mounted on sides thereof to enable connection of cables 9 to the connectors 5 and 7 thereof. Conversely, the connectors 5 and 7 enable connection of communication devices 10 to the cables 9 (FIG. 1) for communication with other devices 10 (FIG. 1) connected to the cables 9.

Figure 1:
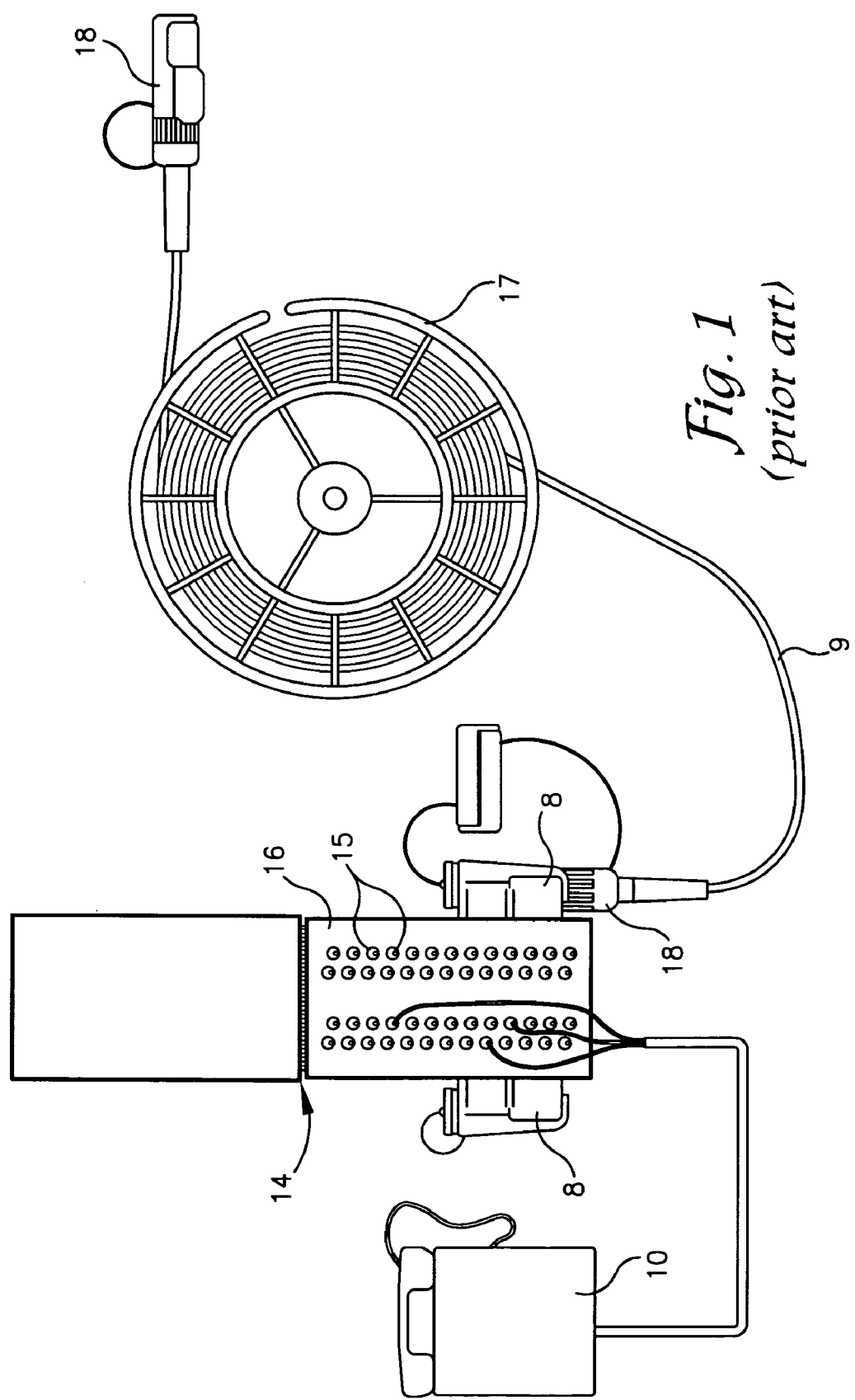
FIG. 1 is a view of a J-1077 field communication distribution box along with a cable reel and cable and a telephone set.

Referring to FIG. 1, the conventional field communication distribution box 14, with the military designation J-1077 A/U or simply J-1077, has a plurality of spring post connectors 15 mounted on a panel 16. The box 14 has the capability of interconnecting a pair of the cables 9 and provides for the connection of communication devices 10, such as telephone sets, to conductor pairs in the cables 9. FIG. 1 shows a cable reel 17 on which a cable 9 is stored and from which it is paid out from one box 14 to the next. The illustrated cable 9 (designated as CX-4566 A/G) has 26 numbered pairs of conductors and terminates at each end in a multi-terminal cable connector 18 (designated as a U-185 B/G connector). The cable connectors 18 mate with one of the box connectors 8 (designated U-187 A/G connectors) to interconnect two cables 9 and to enable connections of the devices 10 to the conductors of the cables 9.

The insulation displacement connector 5 generally has a movable top section 21 which comprises two wire insertion holes and pivotally connected to a lower fixed section 22 which houses a pair of terminal strips. The terminal strips (not shown) have a wire engaging portion at one end for engaging and making electrical contact with a wire. The terminal strips are generally parallel to one another but offset to provide a sufficient dielectric strength between them. The top movable section 21 of the connector 5 pivots about a fixed axis located toward the back side of the connector. The top section 21 has a movable latch member to maintain the top section in its closed position. To open the top section, a user the top section to its raised or open position (FIG. 8). When the top section is open, the terminal strips do not intersect the wire insertion holes, and when the top section is closed (FIG. 7), the terminal strips intersect the wire insertion holes. In order to establish an electrical connection between the wires and the terminal strips a user first opens the top section, i.e., pivots the top section to its open position, inserts the pair of wires, and then closes the top section. Upon closing the top section of the connector, the wires are forced through the terminal strip engaging portion to make electrical and mechanical contact with the terminal strips. To remove the wires and/or break the electrical connection, the process is reversed. A preferred type of insulation displacement connector 5 is manufactured by Channell Commercial Corporation of Temecula, Calif. (www.channellcomm.com) and sold under the trademark Mini-Rocker. Such connectors are also sometimes referred to as Mil-Lok connectors.

Figure 9:
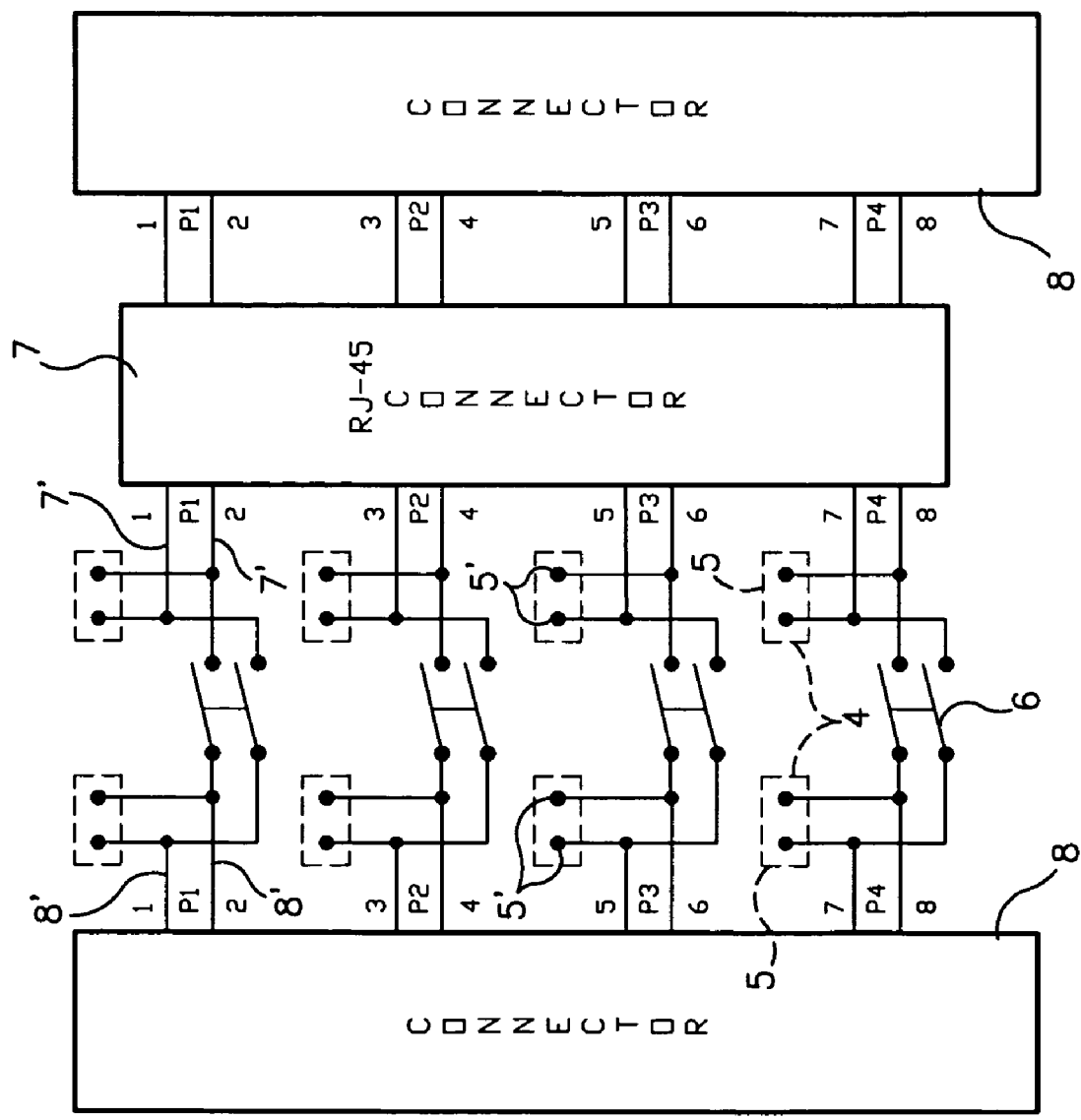
FIG. 9 is a schematic diagram illustrating test switches interconnecting terminals of pairs of insulation displacement connectors of the modified J-1077 distribution box of the present invention and further illustrates the connection of a multiconductor connector to a plurality of pairs of the insulation displacement connectors.

Each set spring binding posts 15 on the connector panel of the conventional J-1077 distribution box 14 is replaced by a set 4 of insulation displacement connector units or connector devices 5. The pair of connector units 5 provides for redundancy should one of the receptacles malfunction or be damaged. The insulation displacement connectors 5 enable faster and more reliable connections since the wires to be inserted do not require stripping. The terminals 5' (FIG. 9) of each connector unit 5 are connected to associated pairs of conductors 8' in the box connectors 8. Referring to FIG. 9, the terminals of a first one of the pair 4 of connector units 5 are connected to the box connector 8 on one side of the box 1 while the terminals of the second of the pair 4 are connected to the box connector 8 on the opposite side of the box 1.

In order to facilitate troubleshooting to find which circuit may have a problem, it is a common practice with the older box 14 to remove a conductor from a binding post 15, one at a time, until the problem circuit is identified. Such disconnecting and reconnecting is laborious and can damage the stripped wire ends, requiring that the wire end be stripped before reconnecting. The present invention overcomes this problem by providing a test switch 6 to interconnect the sets of terminals of each pair 4 of connector units 5. A double pole, single throw switch configuration is preferred. When the switch contacts are closed, the terminals of each pair 4 are interconnected. However, when the switch contacts are opened, the conductors of cables 9 on both sides of the box 1 can be individually tested, without removing wires from the connector units 5.

The present invention provides a means of detecting the approximate location of a cut or break in one of a series of interconnected cables 9. Typically, the cables 9 are formed by 26 numbered pairs of conductors. Normally, only 25 pairs carry communication signals, while the No. 26 pair is used for testing and troubleshooting purposes.

Figure 10:
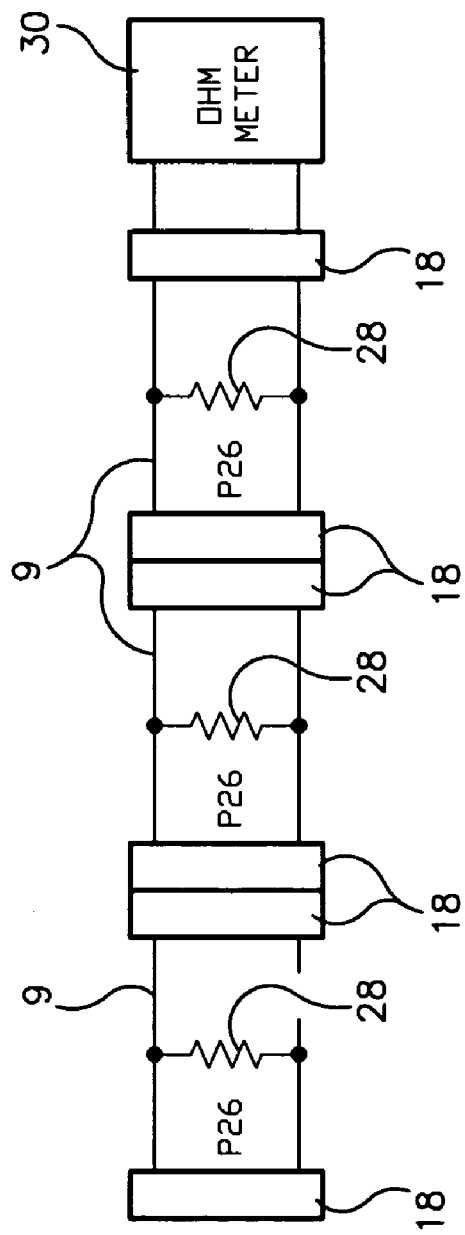
FIG. 10 is a schematic diagram illustrating a plurality of interconnected cables of the present invention with resistors to enable the location of a break in a cable.

Referring to FIG. 10, the present invention provides at least one resistor 28 per cable, connected across the No. 26 conductor pair. The value of the resistor is standardized and may range from about 1000 ohms (1 kilohm) to several hundred kilohms. A number of cables 9 are normally strung together end-to-end using boxes 10 or other kinds of appropriate connectors. Normally, a technician will be aware of the exact number of cables 9 present in a given communication network. Each cable 9 added, in the present invention, connects an additional resistor 28 in parallel, thereby further dividing the equivalent resistance of all the interconnected resistors 28. Additionally, the resistance of a given length of the conductor pair is known. The unbroken length of the composite cable is related to the equivalent resistance measured across the No. 26 conductor pair. If the value of the standard resistor is relatively high, the in-line resistance of the conductor pair is less significant in proportion to the standard resistors, such that the equivalent resistance of the cable is effectively the parallel combination of the standard resistors. Thus, the equivalent resistance of the cable is inversely proportional to the length of the composite cable.

For example, if the composite cable is formed by ten cable sections, each with a standard resistor connected across the No. 26 pair, then the equivalent resistance measured is one tenth of the value of the standard resistor. However, if ten cable sections should be present and the resistance measured by an ohm meter 30 from one end is, for example, one seventh the value of the standard resistor, then the technician knows that there is a break in the eighth section. By this means, the broken cable section can be replaced or repaired quickly and directly without the need to inspect each section. Alternatively, resistor 28 may be connected across each end of the No. 26 pair of each cable section 9. By this means, the integrity of a single cable section 9 can be determined by measuring the resistance across the No. 26 conductor pair.

The present invention also contemplates connecting a cable monitor circuit to the No. 26 cable pair which monitors the equivalent resistance of the composite cable. Such a cable monitor would preferably be based on a programmable digital computer or at least a programmable microprocessor to provide for a variety of desirable features. The number of sections and the value of the standard resistor are entered into the monitor circuit. If the monitored resistance varies by greater than a selected tolerance, an alarm is activated. The change in resistance could be a consequence of the cable being damaged or being disconnected by an enemy to insert listening equipment into the line. In either case, once the occurrence to line interruption has been alerted, the approximate location of the break can be located by the procedures described previously.

In some applications, it may be desirable to provide in-line electrical fuses (not shown) to the conductors of the cable to protect circuits and equipment connected thereto. Such fuses may be rated at relatively low levels of current, such as 375 milliamperes, because of the relatively low power levels of signals intended to be carried by the conductors of the system. The fuses protect the circuits connected thereto from damage due to short circuits, current surges, and the like. The fuses are preferably provided in such a manner that they can be easily replaced if blown.

In order to provide for digital communications between computers and computerized equipment, the improved type distribution box 1 of the present invention may have various types of auxiliary connectors 7 having auxiliary connector terminals 7' interconnected to the terminals 5' of the insulation displacement connector units 5. Such connectors can include, but are not limited to, RJ-45, RJ-11, and RJ-12 modular type connectors; BNC type connectors; F-type connectors, fiber optic adapters, and other connectors commonly employed for interconnections between computers, computer networks, modems, and the like. Conductors of the cables 9 interconnecting the boxes 1 and carrying data between computers may be shielded separately from the other conductor pairs to minimize possible interference to and from other signals on other conductor pairs. Data connectors and associated cable conductors would provide some limited computer networking capabilities in addition to more conventional analog voice communications in systems employing conventional J-1077 type distribution boxes.

Figure 4:
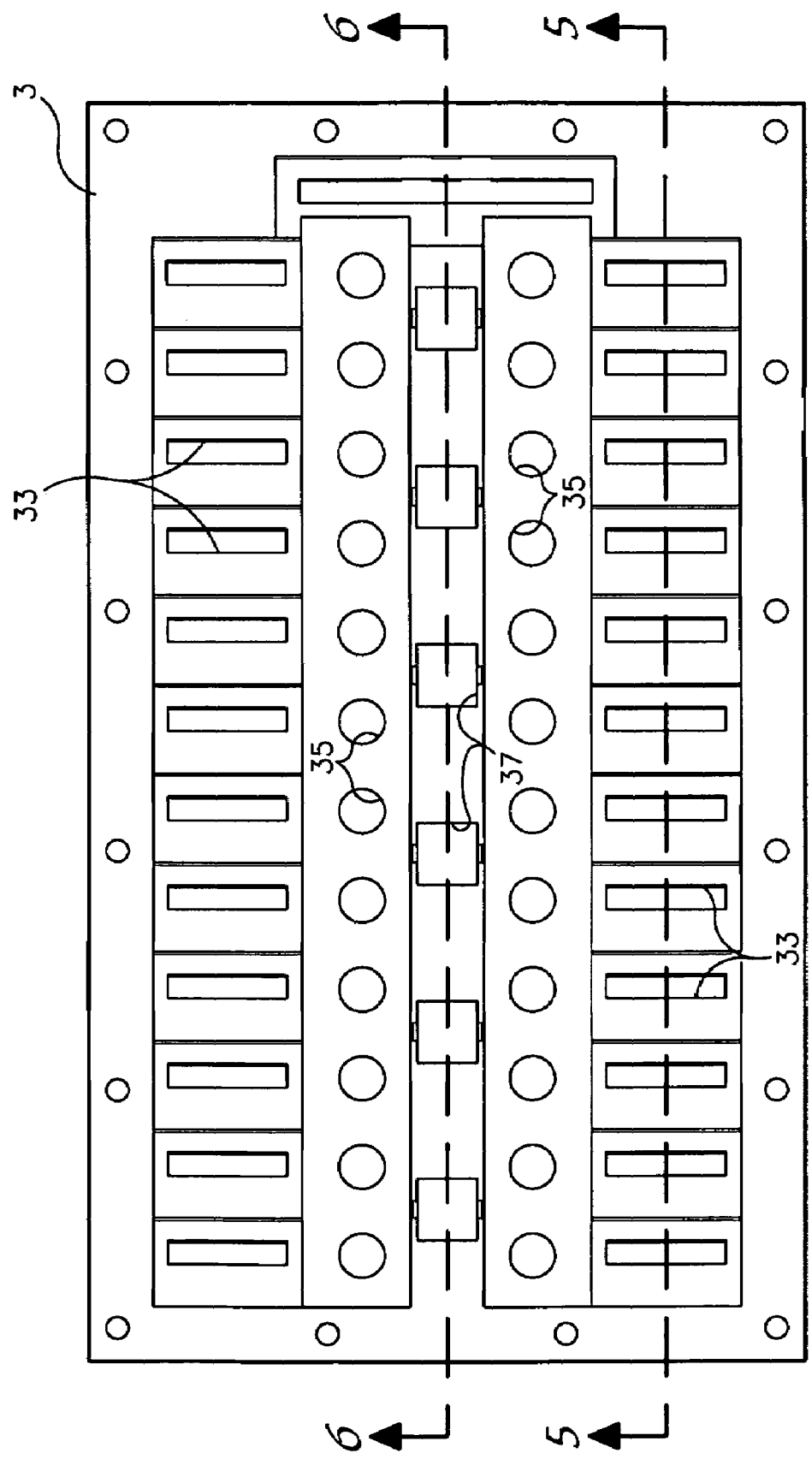
FIG. 4 is an enlarged plan view of a connector panel of the modified J-1077 box with connectors and switches removed.

FIGS. 4-6 illustrate an improved panel 3 suitable for use with the modified distribution box 1. The panel 3 includes slots 33 to receive pairs 4 of the connector units 5, circular apertures 35 to receive the test switches 6, and square openings 37 to receive the auxiliary connectors 7. As shown in FIG. 5, the panel 3 may have its surface relieved in an angular configuration around the slots 33 at 39 to position the connector units 5 at a more convenient attitude for access by a technician.

Figure 11:
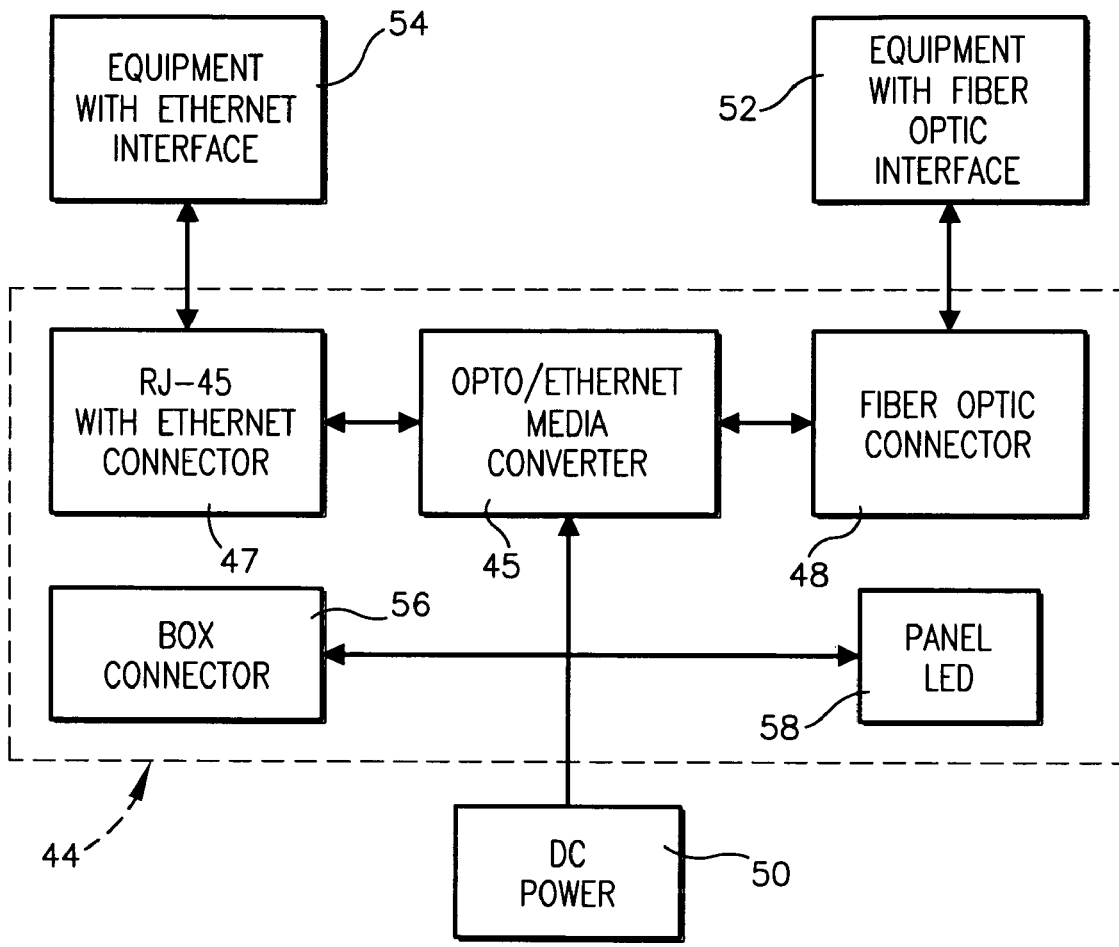
FIG. 11 is a block diagram illustrating an embodiment of a field data distribution system with a fiber optic converter according to the present invention.

FIG. 11 diagrammatically illustrates an embodiment of the distribution box 44 incorporating media converter circuitry 45 for converting data formats between an electrical data format and an optical data format. The box 44 includes auxiliary connectors 47 and 48, of which connector 47 is an electrical data connector such as an RJ-45 Ethernet type connector and connector 48 is an optical connector such as an ST type optical connector. In general, the media converter bilaterally or bidirectionally converts between an electrical data signal format carried by the electrical connector 47 and an optical data signal format carried by the optical connector 48. The media converter circuit 45 may, for example, be a Signamax Connectivity Systems 065-1195 unit from AESP, Inc. (www.signamax.com). It is foreseen that other types of media converter units could alternatively be employed. The illustrated media converter converts from a 1000Base-T format, a gigabit Ethernet format for a twisted pair of electrical conductors, to an 1000Base-SX format, a gigabit optical Ethernet format for carriage by an optical fiber. The illustrated media converter 45 is powered by a DC power source 50 which may be a transformer and rectifier unit plugged into a power strip or generator, a battery of the appropriate voltage, or the like. The media converter 45 allows optical equipment 52 with a fiber optic interface to communicate data with electrical equipment 54 having an electrical Ethernet interface and vice versa. The electrical equipment 54 can be local to the distribution box 44 or can be remote from the box 44 and connected by a cable similar to the cable 9 described above and connected to a local box connector 56, similar to the box connector 8. The DC power source 50 may be connected to a panel indicator, such as an LED 58 to indicate activation of the media converter 45. The power source 50 may also be connected to the box connector 56 to provide DC power through a cable connected to the box connector 56 remote from the distribution box 44.

Figure 12:
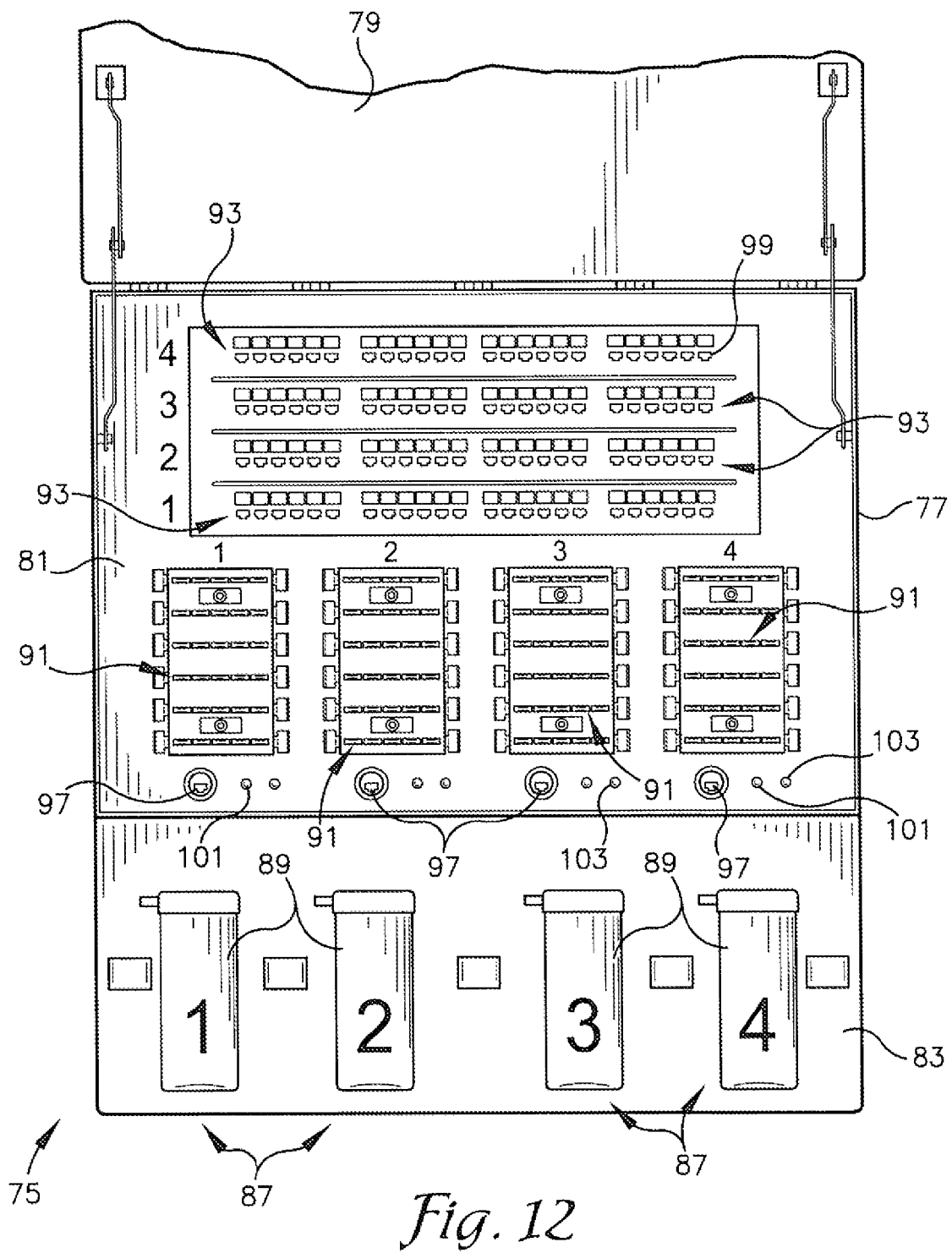
FIG. 12 is a fragmentary top plan view of an embodiment a quad field data distribution system with fiber optic converter according to the present invention including four intercommunication groups, each group including a box connector, sets of insulation displacement connectors, sets of auxiliary connectors, and optical/electrical media converter circuitry.

FIG. 12 illustrates an expanded data signal distribution panel or box 75. The illustrated box 75 includes a main housing 77, a lid or cover 79 hinged to the main housing 77, a main panel 81, and an extension panel 83. The box 75 is provided with a plurality of independent interconnection groups 87 of connector elements, such as the four interconnection groups illustrated. Each interconnection group 87 includes a box connector 89, a set of insulation displacement connectors 91, and a set of standardized auxiliary connectors 93. The illustrated connector elements 89, 91, and 93 of each respective interconnection group 87 shown in FIG. 12 are given a common label of 1, 2, 3, or 4. Thus, the connectors 91 of group 3 are associated with the box connector 89 and auxiliary connectors 93 of labeled for group 3.

The box connectors 89 are mounted on the extension panel 83 and are similar to the box connectors 8, preferably similar to the type of cable connector receptacle designated U-187 A/G. Each of the illustrated box connectors 89 has 26 pairs of electrical contacts or terminals (not shown) which are configured and patterned for receiving a U-185 B/G cable connector. In the box 75, twenty-four of the terminal pairs of a connector 89 are connected by conductors (not shown) to corresponding ones of the insulation displacement connectors 91. The illustrated insulation displacement connectors 91 are substantially similar to the connectors 5 described above. In the illustrated box 75, the auxiliary connectors 93 are RJ-45 connectors which are commonly used for Ethernet connections. Each of the illustrated auxiliary connectors 93 has four active terminals (not shown) which are connected by conductors (not shown) to two pairs of terminals of an adjacent pair of insulation displacement connectors 91 of a given interconnection group 87. FIG. 12 illustrates thirty insulation displacement connectors 91 and twenty-four RJ-45 connectors 93 in each interconnection group 87. Thus, the illustrated box 75 provides extra connectors 91 and 93 for redundancy, custom wiring as needed, substitution for broken connectors, and the like.

Each of the interconnection groups 87 includes an optical to a bidirectional electrical media converter circuit (not shown) similar to the media converter circuit 45 of the box 44. A standardized optical data connector 97 is provided on the panel 81 and interfaced to the media converter circuit. The optical data connector 97 can, for example, be an ST type of optical connector. One of the extra RJ-45 connectors 93, such as the twenty-fourth connector 99 of each interconnection group 87, is also interfaced to the media converter circuit as a conversion connector. Although the conversion connector 99 is not connected directly to one of the box connectors 89, a patch cord (not shown) can be connected from the conversion connector 99 to a live connector 93 to enable a signal from the media converter circuit to be sent through or received from a cable connected to one of the box connectors 89. Additionally, such patch cords can be used to bridge from RJ-45 connectors 93 of one interconnection group 87 to another group 87 to thereby transfer signals from one box connector 89 to another.

Interconnections from one interconnection group 87 to another can be made by conductors bridging between the insulation displacement connectors 91 of one group 87 to another. The connectors 91 and 93 can also provide for the interconnection of communication equipment 10 or 54 by way of the distribution box 75. Operating power for the media converter circuit of each interconnection group 87 can be provided by a DC power source, similar to the source 50 described above with reference to the box 44. A power jack 101 is provided on the panel 81 for each group 87, along with a pilot LED 103 to indicate that the media converter circuit is active. The jack 101 can be connected through internal wiring to one of the terminal sets of the box connector 89 of the corresponding group to provide DC power remote from the box 75.

The illustrated distribution box 75 functions in a manner similar to four of the distribution boxes 44 and provides greatly expanded signal distribution capabilities for military field communications.

It is to be understood that while certain forms of the present invention have been illustrated and described herein, it is not to be limited to the specific forms or arrangement of parts described and shown.

What is claimed and desired to secure by Letters Patent is:

1. A field communication distribution apparatus for use with a plurality of cables, each cable formed by a plurality of cable conductor pairs to enable temporary connection of communication devices to said conductor pairs, said cable terminating in a cable connector including pairs of terminals for each of said conductor pairs, said apparatus comprising:
   (a) a weatherproof housing;
   (b) a panel positioned in said housing and having a plurality of groups of connector devices mounted thereon;
   (c) each of said connector devices including a pair of insulation displacement connectors therein which enable connection thereto of unstripped insulated conductors of a communication device;
   (d) a plurality of interconnection groups, each interconnection group corresponding respectively with one of said groups of connector devices on said panel and including:
      (1) a box connector having a plurality of box conductor pairs, each of said box connector pairs being connected to a respective pair of insulation displacement connectors of one of said connector devices, said box connector being compatible with said cable connector to enable removable connection of said cable to said box connector;
      (2) an electrical data connector mounted on said panel and configured to carry an electrical data signal;
      (3) an optical connector mounted on said panel and configured to carry an optical data signal; and
      (4) media converter circuitry coupled between said electrical data connector and said optical connector and bilaterally converting between an electrical data signal received at said electrical data connector to an optical data signal at said optical connector or between an optical data signal received at said optical connector to an electrical data signal at said electrical data connector.

2. An apparatus as set forth in claim 1 wherein:
   (a) said electrical data connector is a standard Ethernet connector and said electrical data signal and said optical data signals are Ethernet data signals.

3. An apparatus as set forth in claim 1 wherein:
   (a) said electrical data connector is a standard Ethernet connector and said electrical data signal and said optical data signals are gigabit Ethernet data signals.

4. An apparatus as set forth in claim 1 wherein each interconnection group includes:
   (a) a plurality of auxiliary connectors mounted on said panel, each of said auxiliary connectors having respective auxiliary connector terminals connected to the insulation displacement connectors of a selected connector device, said auxiliary connectors being of standard configurations to enable connection of communication devices having connectors compatible respectively with said auxiliary connectors to selected conductor pairs of said cable.

5. An apparatus as set forth in claim 1 wherein each interconnection group includes:
   (a) a DC power jack mounted on said panel and interconnected to said media converter circuitry of said interconnection group to enable connection of a source of operating power to said media converter circuitry.

6. An apparatus as set forth in claim 5 and including:
   (a) a DC power supply connected to said DC power jack for providing said operating power to said media converter circuitry.

7. An apparatus as set forth in claim 1 wherein each interconnection group includes:
   (a) a DC power jack mounted on said panel and interconnected to said media converter circuitry of said interconnection group to enable connection of a source of operating power to said media converter circuitry; and
   (b) said DC power jack is connected through a respective one of said connector devices to a corresponding conductor pair of a box connector of said interconnection group for providing a source of electrical power remote from said apparatus.

8. A field communication distribution apparatus for use with a cable formed by a plurality of cable conductor pairs to enable temporary connection of communication devices to said conductor pairs, said cable terminating in a cable connector including pairs of terminals for each of said conductor pairs, said apparatus comprising:
(a) a weatherproof housing;
(b) a panel positioned in said housing and having a plurality of groups of connector devices mounted thereon;
(c) each of said connector devices including a pair of insulation displacement connectors therein which enable connection thereto of unstripped insulated conductors of a communication device;
(d) a plurality of interconnection groups, each interconnection group corresponding respectively with one of said groups of connector devices on said panel and including:
  (1) a box connector having a plurality of box conductor pairs, each of said box connector pairs being connected to a respective pair of insulation displacement connectors of one of said connector devices, said box connector being compatible with said cable connector to enable removable connection of said cable to said box connector;
  (2) a plurality of auxiliary connectors mounted on said panel, each of said auxiliary connectors having respective auxiliary connector terminals connected to the insulation displacement connectors of a selected connector device, said auxiliary connectors being of standard configurations to enable connection of communication devices having connectors compatible respectively with said auxiliary connectors to selected conductor pairs of said cable;
  (3) an electrical data connector mounted on said panel and configured to carry an electrical data signal;
  (4) an optical connector mounted on said panel and configured to carry an optical data signal; and
  (5) media converter circuitry coupled between said electrical data connector and said optical connector and bilaterally converting between an electrical data signal received at said electrical data connector to an optical data signal at said optical connector or between an optical data signal received at said optical connector to an electrical data signal at said electrical data connector.

9. An apparatus as set forth in claim 8 wherein:
(a) said electrical data connector is a standard Ethernet connector and said electrical data signal and said optical data signals are Ethernet data signals.

10. An apparatus as set forth in claim 8 wherein:
(a) said electrical data connector is a standard Ethernet connector and said electrical data signal and said optical data signals are gigabit Ethernet data signals.

11. An apparatus as set forth in claim 8 wherein each interconnection group includes:
(a) a DC power jack mounted on said panel and interconnected to said media converter circuitry of said interconnection group to enable connection of a source of operating power to said media converter circuitry.

12. An apparatus as set forth in claim 11 and including:
(a) a DC power supply connected to said DC power jack for providing said operating power to said media converter circuitry.

13. An apparatus as set forth in claim 8 wherein each interconnection group includes:
(a) a DC power jack mounted on said panel and interconnected to said media converter circuitry of said interconnection group to enable connection of a source of operating power to said media converter circuitry; and
(b) said DC power jack is connected through a respective one of said connector devices to a corresponding conductor pair of a box connector of said interconnection group for providing a source of electrical power remote from said apparatus.

14. A field communication distribution apparatus for use with a cable formed by a plurality of cable conductor pairs to enable temporary connection of communication devices to said conductor pairs, said cable terminating in a cable connector including pairs of terminals for each of said conductor pairs, said apparatus comprising:
(a) a weatherproof housing;
(b) a panel positioned in said housing and having a plurality of groups of connector devices mounted thereon;
(c) each of said connector devices including a pair of insulation displacement connectors therein which enable connection thereto of unstripped insulated conductors of a communication device;
(d) a plurality of interconnection groups, each interconnection group corresponding respectively with one of said groups of connector devices on said panel and including:
  (1) a box connector having a plurality of box conductor pairs, each of said box connector pairs being connected to a respective pair of insulation displacement connectors of one of said connector devices, said box connector being compatible with said cable connector to enable removable connection of said cable to said box connector;
  (2) a plurality of auxiliary connectors mounted on said panel, each of said auxiliary connectors having respective auxiliary connector terminals connected to the insulation displacement connectors of a selected connector device, said auxiliary connectors being of standard configurations to enable connection of communication devices having connectors compatible respectively with said auxiliary connectors to selected conductor pairs of said cable;
  (3) an electrical data connector mounted on said panel and configured to carry an electrical data signal;
  (4) an optical connector mounted on said panel and configured to carry an optical data signal;
  (5) media converter circuitry coupled between said electrical data connector and said optical connector and bilaterally converting between an electrical data signal received at said electrical data connector to an optical data signal at said optical connector or between an optical data signal received at said optical connector to an electrical data signal at said electrical data connector;
  (6) a DC power jack mounted on said panel and interconnected to said media converter circuitry to enable connection of a source of operating power to said media converter circuitry; and
  (7) said DC power jack is connected through a respective one of said connector devices to a corresponding conductor pair of a box connector of said interconnection group for providing a source of electrical power remote from said apparatus.

15. An apparatus as set forth in claim 14 wherein:
(a) said electrical data connector is a standard Ethernet connector and said electrical data signal and said optical data signals are gigabit Ethernet data signals.

16. An apparatus as set forth in claim 14 and including:
(a) a DC power supply connected to said DC power jack for providing said operating power to said media converter circuitry.

* * * * *